US012566973B1

(12) United States Patent　(10) Patent No.:　US 12,566,973 B1

Cao et al.　(45) Date of Patent:　Mar. 3, 2026

(54) HIERARCHICAL UNIFIED GRAPH EMBEDDING

(71) Applicant: Amazon Technologies, Inc., Reno, NV (US)

(72) Inventors: Kun Cao, New York, NY (US); Sesi Bhushan Somarouthu, Burnaby (CA); Stuart Myles, Newtown, PA (US); Matthew Gordon Yanchyshyn, Brooklyn, NY (US); Tapodipta Ghosh, Princeton Junction, NJ (US)

(73) Assignee: Amazon Technologies, Inc., Reno, NV (US)

( * ) Notice: Subject to any disclaimer, the term of this patent is extended or adjusted under 35 U.S.C. 154(b) by 1068 days.

(21) Appl. No.: 17/486,405

(22) Filed: Sep. 27, 2021

(51) Int. Cl.
| | |
|---|---|
| *G06N 5/02* | (2023.01) |
| *G06F 18/20* | (2023.01) |
| *G06F 18/214* | (2023.01) |
| *G06N 20/20* | (2019.01) |
| *G06V 10/75* | (2022.01) |

(52) U.S. Cl.
CPC ............ *G06N 5/02* (2013.01); *G06F 18/214* (2023.01); *G06F 18/29* (2023.01); *G06N 20/20* (2019.01); *G06V 10/751* (2022.01)

(58) Field of Classification Search
CPC ........ G06N 5/02; G06N 20/20; G06V 20/751; G06F 18/29; G06F 18/214
USPC ........................................................ 706/45
See application file for complete search history.

(56) References Cited

U.S. PATENT DOCUMENTS

| | | | | |
|---|---|---|---|---|
| 11,526,558 B2 * | 12/2022 | Duong | ................... | G06F 16/904 |
| 2020/0160215 A1 * | 5/2020 | Kotnis | ................... | G06N 20/10 |
| 2021/0118442 A1 * | 4/2021 | Poddar | ................... | G06F 40/205 |

OTHER PUBLICATIONS

Dai et al., "A Survey on Knowledge Graph Embedding: Approaches, Applications and Benchmarks", Electronics 2020, 9, 750, 2020 (Year: 2020).*

Rossi et al., "Knowledge graph embedding for link prediction: a comparative analysis", ACM Transactions on Knowledge Discovery from Data, vol. 15, No. 2, Article 14, Dec. 2020 (Year: 2020).*

* cited by examiner

*Primary Examiner* — Tsu-Chang Lee

(74) *Attorney, Agent, or Firm* — Hogan Lovells US LLP

(57)　　　　ABSTRACT

Approaches in accordance with various embodiments provide unified training and inference frameworks useful for co-training, and performing inferencing using, models such as language and graphing models. The frameworks can be hierarchical, in that an inner layer can include a language model for generating semantic embeddings from input text content, and these semantic embeddings can be passed as input to an outer layer that can generate graph labels based, at least in part, upon a knowledge graph having these semantic embeddings substituted for textual content. Nodes of a knowledge graph that are determined to be related to the input content can then be used for various purposes, such as to generate tags for the content or determine how to route that content.

20 Claims, 10 Drawing Sheets

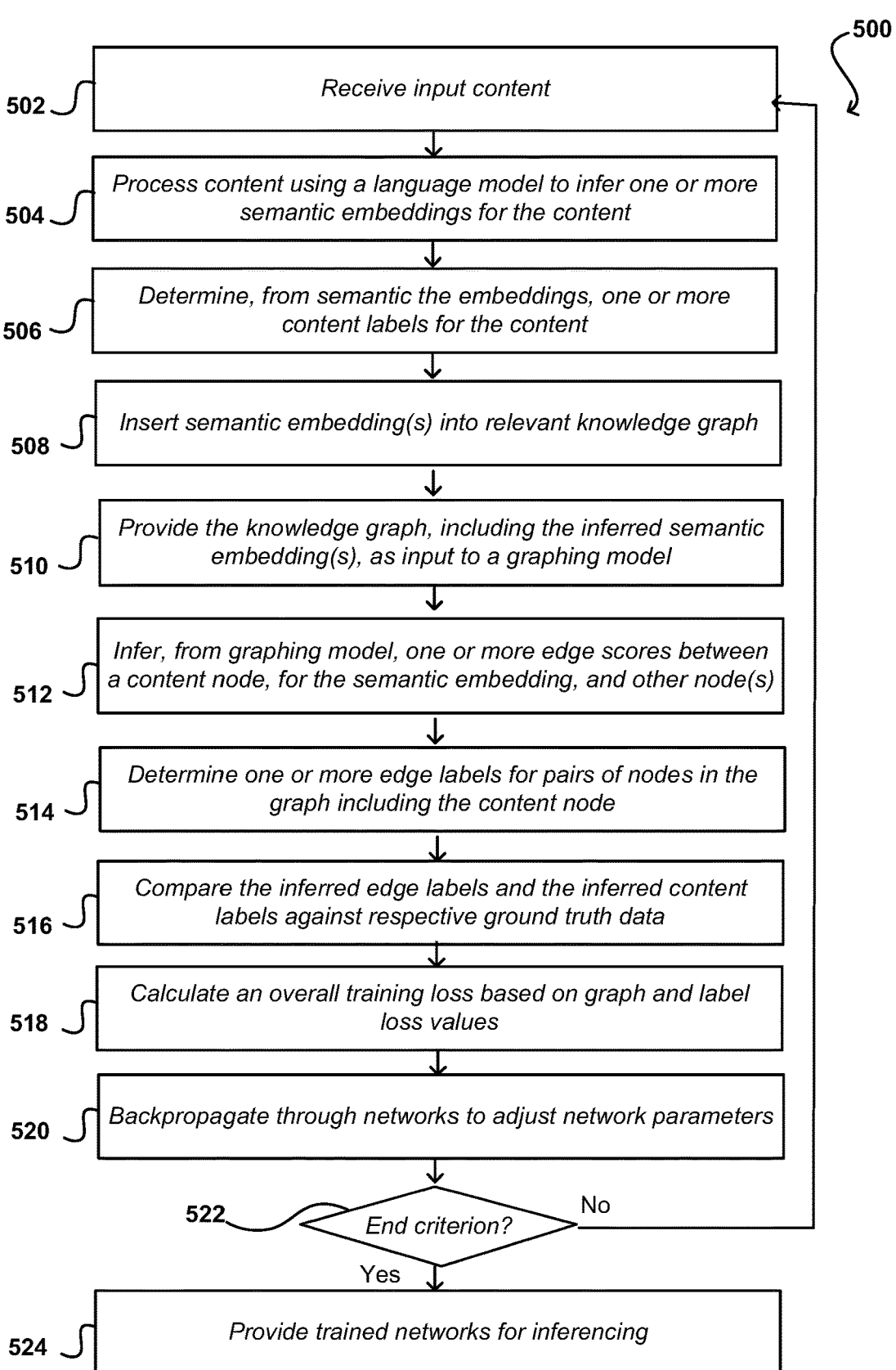

502   Receive input content

504   Process content using a language model to infer one or more semantic embeddings for the content 506   Determine, from semantic the embeddings, one or more content labels for the content 508   Insert semantic embedding(s) into relevant knowledge graph 510   Provide the knowledge graph, including the inferred semantic embedding(s), as input to a graphing model 512   Infer, from graphing model, one or more edge scores between a content node, for the semantic embedding, and other node(s)

514   Determine one or more edge labels for pairs of nodes in the graph including the content node 516   Compare the inferred edge labels and the inferred content labels against respective ground truth data 518   Calculate an overall training loss based on graph and label loss values 520   Backpropagate through networks to adjust network parameters 522   End criterion?   No Yes 524   Provide trained networks for inferencing

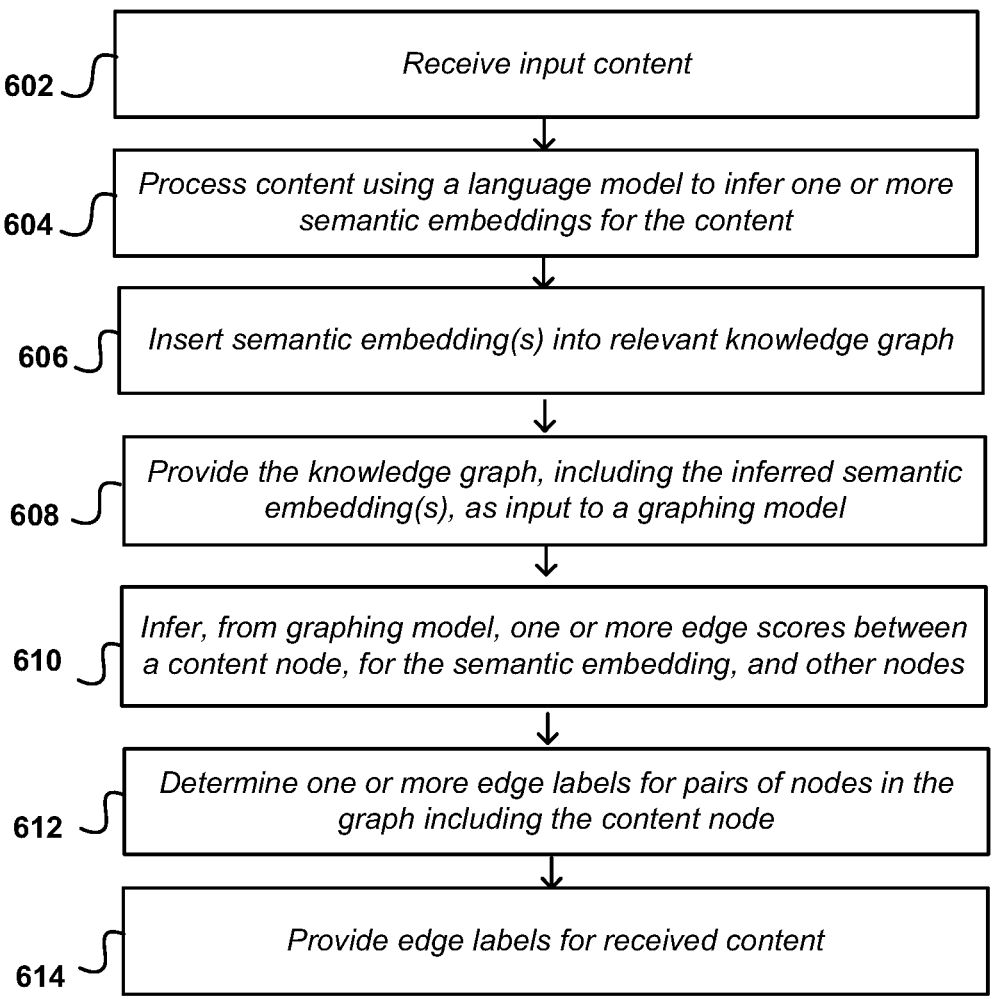

602 — Receive input content

604 — Process content using a language model to infer one or more semantic embeddings for the content 606 — Insert semantic embedding(s) into relevant knowledge graph 608 — Provide the knowledge graph, including the inferred semantic embedding(s), as input to a graphing model 610 — Infer, from graphing model, one or more edge scores between a content node, for the semantic embedding, and other nodes 612 — Determine one or more edge labels for pairs of nodes in the graph including the content node 614 — Provide edge labels for received content

FIG. 6

Input Layer 802
Output Layer 806
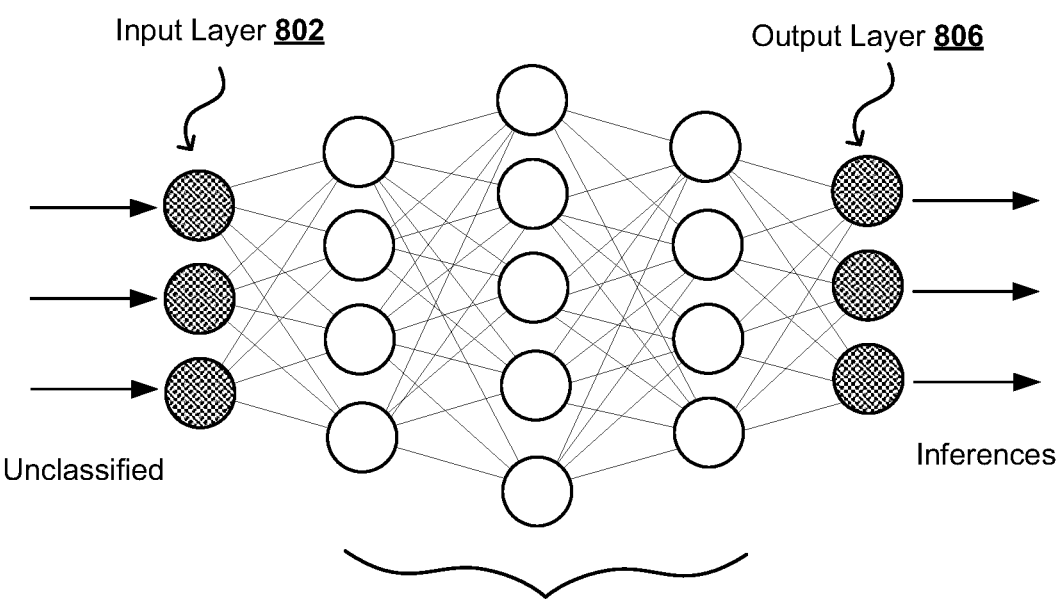
Unclassified
Inferences
Intermediate Layers 804
FIG. 8

HIERARCHICAL UNIFIED GRAPH EMBEDDING

BACKGROUND

As an ever-increasing amount of content is being generated and stored electronically, there is a corresponding need to improve ways in which this content can be located and accessed. This can include, for example, ways to categorize or label new instances of content. Conventional approaches attempt to utilize known relationships between different content instances to categorize or determine relationships for new content, but relying on such data can produce results that may not be as accurate as desired.

BRIEF DESCRIPTION OF THE DRAWINGS

Various embodiments in accordance with the present disclosure will be described with reference to the drawings, in which:

FIG. 5 illustrates an example process for training one or more networks that can be utilized in accordance with various embodiments.

FIG. 6 illustrates an example process for performing inferencing using a trained neural network that can be utilized in accordance with various embodiments.

FIG. 8 illustrates an example neural network that can be utilized in accordance with various embodiments.

DETAILED DESCRIPTION

Approaches described and suggested herein relate to the training and use of machine learning models and neural networks. In particular, various approaches provide hierarchical, unified graph embedding frameworks that can be used for co-training of machine learning models, such as a language model and a graphing model, as well as for inferencing using those trained models. An algorithm can then be used on top of this framework to utilize the inferences for a specific task, such as content tagging or routing. Such a framework can be hierarchical, including an inner layer that utilizes a language model to infer semantic embeddings from input textual content. These embeddings can be provided as input to an outer layer that utilizes a graph model to generate graph labels, based at least in part upon a knowledge graph into which these semantic embeddings have been injected. The graph labels can thus be inferred based on the semantics embeddings in addition to the known relations or structure in the knowledge graph.

Various other such functions can be used as well within the scope of the various embodiments as would be apparent to one of ordinary skill in the art in light of the teachings and suggestions contained herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
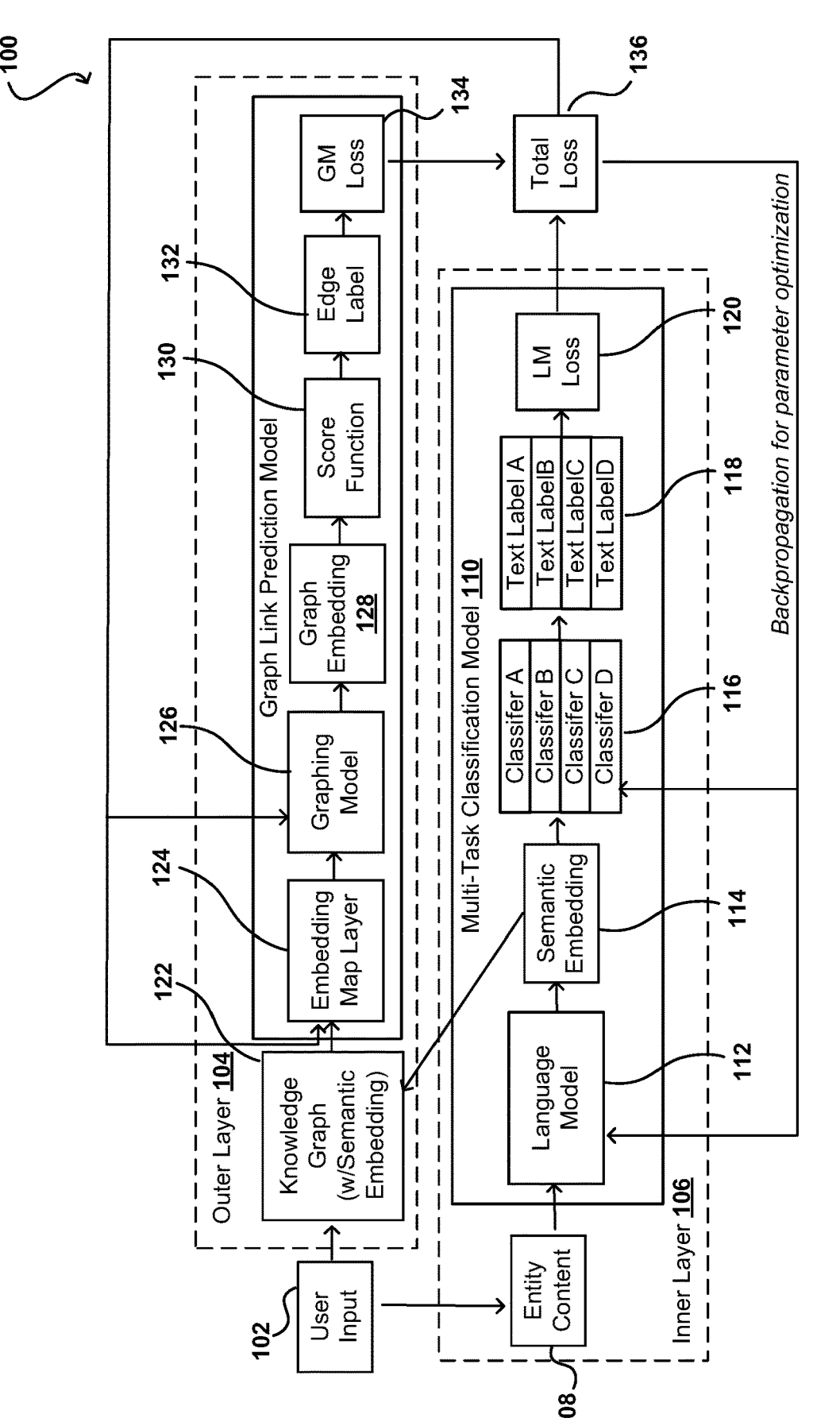
FIG. 1 illustrates an example system for training one or more neural networks that can be utilized in accordance with various embodiments.

FIG. 1 illustrates an example training framework 100 that can be utilized in accordance with various embodiments. Such a framework can be utilized to train one or more neural networks to perform inferencing for a variety of tasks, such as content tagging or recommendations. In this example, this training framework 100 provides for a modeling approach that takes advantage of hierarchical unified graph embedding (HUGE) using at least two machine learning models that can be co-trained to improve accuracy and efficiency. Such a training framework can overcome deficiencies in conventional graph-based tagging systems, as such a framework can consider the content itself, and not just the connection between instances of content in a graph, which can improve tagging accuracy, particularly when the graph is sparse, and is not limited to transductive inference.

The training pipeline 100 of FIG. 1 includes an inner layer 106 and an outer layer 104 that each include at least one model to be trained, where an inference of a model in the inner layer 106 can be provided as input to the outer layer 104, and then inferences of both the inner layer and the outer layer can be considered when optimizing using a loss function that contains terms for both layers. For purposes of explanation, this framework will be described for a task of content tagging, but it should be understood that such a framework can be used to train models for other tasks or use cases as well, as discussed and suggested herein. For this example, content tagging involves assigning one or more "tags," or instances of metadata, to one or more instances of content. This content can include any appropriate digital content or data accessible for viewing or presentation to one or more viewers or consumers, as may relate to text, audio, video, virtual reality, image, or other such content and combinations thereof. One benefit of applying a specific tag to an instance or piece of content is that the tag can be used to help locate that instance, as well as to identify related content that may have a same or similar tag applied. Tags can also enable users or applications to group and collect similar instances of content together under specific categories, making it easier to manage, identify, organize, search, and filter content resources. As mentioned, tags can take various forms, such as an alphanumeric string inserted into metadata of a content file, or as an object or instance of data associated with an instance of content, among other such options. Use of consistent and effective tagging can improve system performance as less computing effort is needed to locate and relate instances of content, can improve the experience of users of the system, and can help more content to be consumed as relevant content, or content of interest, can be more accurately and quickly located or identified.

Techniques behind automatic content tagging can be generally be categorized into three buckets, including keyword-based, semantics-based, and graph-based tagging. Keyword-based tagging generally involves labeling content through keyword searching, such as by matching the same authors, organization, publication data, and other such information. Semantics-based tagging can consider the semantic similarity between different instances of contents using one or more language models (LMs). Such an approach typically does not consider latent or direct connections between instances of content outside these semantics. Graph-based tagging, on the other hand, can curate the connections among instances of content through use of a dedicated knowledge graph. Conventional approaches to graph-based tagging have faced challenges as well, as pure graph-based tagging only considers the structure or relationships between instances of content in a knowledge graph, and ignores the instances of content themselves, which can lead to poor tagging performance. Further, graphing models are generally transductive, whereby the tagging system needs to be frequently re-trained to be able to tag new entities or instances of content, which can be expensive in terms of both computing resources and operational cost.

Approaches in accordance with various embodiments can overcome these and other deficiencies in existing approaches by providing a system or service that is backed by a modeling framework, such as a hierarchical unified graph embedding framework 100 as illustrated in FIG. 1. Such a framework may be inspired by fractal (e.g., self-similar) geometries in nature, where structures of an object in different scopes follow similar patterns, and lower level information can be extracted or aggregated at a higher level for consumption. In a unified knowledge graph, this can be expressed in such a way that both microscopic textual contents and macroscopic relational structures can be treated uniformly as components of the same graph with a hierarchical structure.

As illustrated in FIG. 1, an example unified framework 100 includes two hierarchical layers, with an inner layer 106 addressing semantics of textual content and an outer layer 104 addressing the relational structures on top of these semantics which are extracted by this inner layer 106. In this example, when user input (or training data for training purposes) is received 102 (or training data for training purposes), content of one or more instances of entity content 108 from that input can be provided as input to a language model (LM) of a multi-task classification model 110 of the inner layer 106. Here, this inner layer is utilized for language modeling, where a multi-task classification model 110 can be leveraged to perform supervised learning tasks, such as semantic classification or clustering. In at least one embodiment, the input will be the content of these entities in the relevant knowledge graph, and the output will be semantic embeddings 114 (e.g., tensors or numerical vector representations) of the instances of content. In this example, the semantic embeddings can be passed as input to the outer layer 104, and can also be passed to a set of classifiers 116 of the inner layer 106 to attempt to determine one or more labels 118 for these semantic embeddings 114.

The outer layer 104, on the other hand, can be utilized for graph modeling and can include one or more graphing models 126, such as a graph neural network (GNN) that processes data represented by a graph structure, and can be used to predict the existence of edges between content and tag nodes in a specified knowledge graph. Input can include both relational structures and semantic embeddings 114 learned by the inner layer 106, where that input can be in the form of a knowledge graph 122 in which the textual content of various nodes has been replaced by the corresponding semantic embeddings. This data can be passed through an embedding mapping layer 124 then received to a graphing model that can consume the structure and semantics to generate the embeddings of the graph 128, which can include both node and edge embeddings. These graph embeddings 128 can be used to calculate the output of the outer layer, which here is the possibility of an edge between any pair of content and tag entities determined through use of a scoring function 130 (e.g., a dot product). This scoring function can output an edge label 132, which can indicate in this example that the edge should exist, or should not exist, between a pair of nodes in the knowledge graph.

In order to train these networks together, a loss function can be utilized that includes loss terms for both the inner layer 106 and the outer layer 104. For the inner layer 106, the inferred text labels 118 for the semantic embeddings 114 can be compared against a set of ground truth labels to determine a language model loss 120. For the outer layer 104, the inferred edge labels for pairs of content nodes in the knowledge graph can be compared against corresponding ground truth data to determine a graph model loss 134. A loss function can be used to calculate an overall loss value, where that loss function includes terms for both the language model loss 120 and the graphing model loss 134. In this way, backpropagation can be based upon both the graphing loss and semantic loss as aggregated into an overall loss, such that adjustments to network parameters for the graphing model 126 and the language model 112 can be selected to attempt to optimize for both losses or both layers. This process can continue until at least one end condition is satisfied, such as a maximum number of training passes, a use of all training data, or an overall loss value falling within a loss threshold or range, among other such options.

Figure 2:
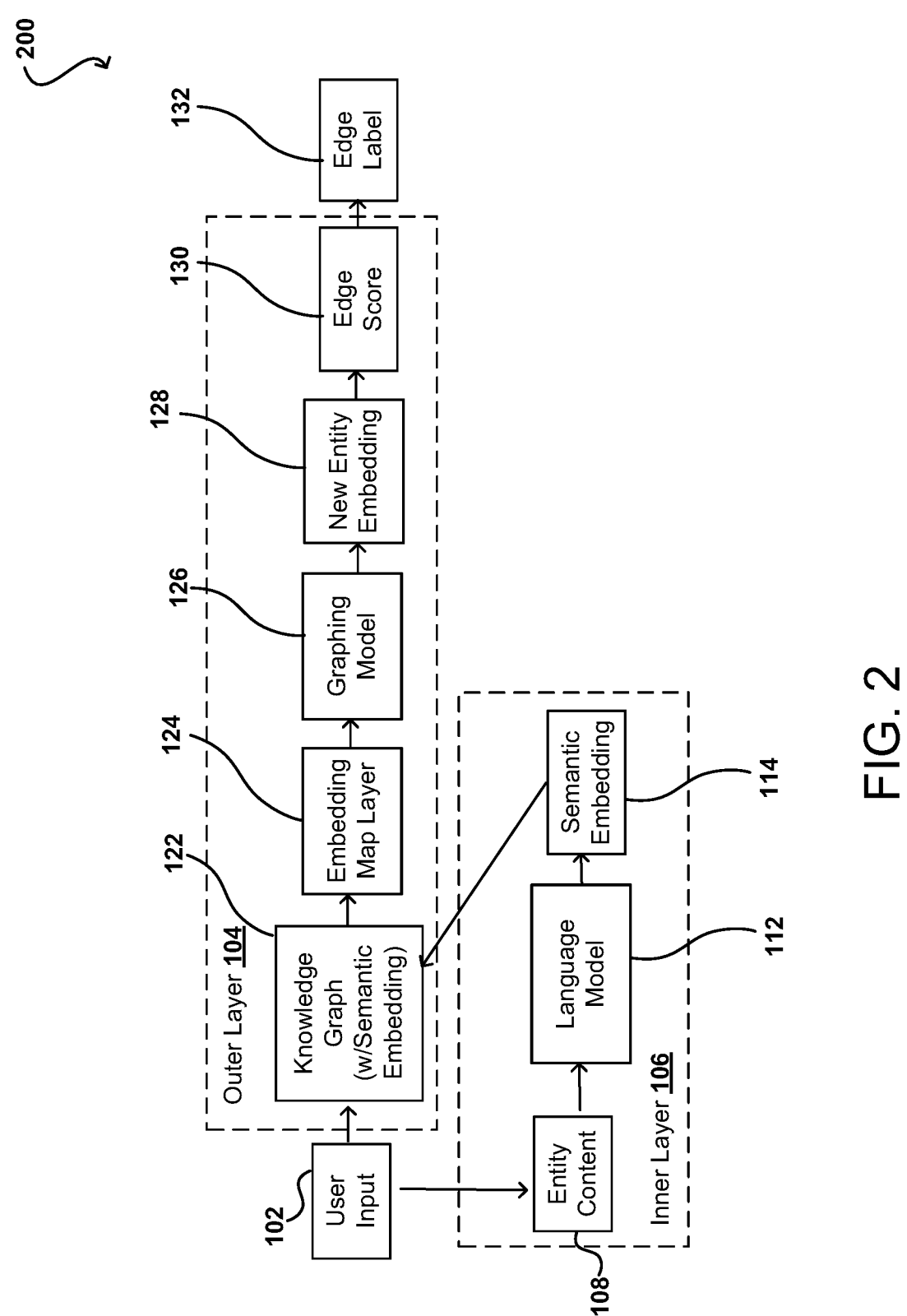
FIG. 2 illustrates an example system for performing inferencing using one or more trained neural networks that can be utilized in accordance with various embodiments.

Once these networks are trained, or the network parameters optimized, these models can be used for inferencing for one or more tasks. FIG. 2 illustrates an example unified inferencing framework 200 that can be utilized in accordance with various embodiments. Reference numbers will be carried over between figures for similar components, although such repetition is intended for simplicity of explanation and should not be interpreted as a limitation on the scope of the various embodiments unless otherwise specifically stated. In this example the hierarchical unified framework 200 includes an inner layer 106 with a trained language model 112 and an outer layer 104 with a trained graphing model 126. At inference time, received user input 102 can be provided to both the inner and outer layers. In the inner layer, the language model 112 will process the entity content 108 from the user input and generate one or more semantic embeddings 114, such as a numerical vector or feature vector corresponding to the entity content. This semantic embedding 114 can be passed as another input to the outer layer. The trained graphing model 126 can then attempt to predict or infer the existence of an edge between a new content mode, corresponding to the semantic embedding 114 of the user input, and any other node in the knowledge graph, and can produce at least one edge label 132 indicating one or more links, edges, or connections between the new node and any other node(s) in the knowledge graph. In at least one embodiment, the descriptive contents of the new entities will be consumed by the trained language model in the inner layer to generate a semantic embedding as the input to the outer layer, in which the trained graph model will generate node embeddings for the new entities. The node embeddings will then be used to calculate the possibility score of a route between the new content and all existing tag nodes, based on which users can determine the tags of the content.

Such a framework can provide for inductive inference, such that new entities or content can be accurately tagged without a need for additional training of the network. As mentioned, an embedding mapping layer can be trained to convert semantic embeddings to the input of a link prediction model, such that the tagging system does not have to be retrained to "learn" the node embeddings of the new entities or content every time they join the graph, so as to calculate the edge possibility score. Instead, the trained embedding mapping layer and graph models can be reused to "calculate" the node embeddings of new entities and the corresponding possibility score, which can produce accurate results with significantly reduced operational cost. Additional cost savings is obtained by the fact that the language and graph models can be co-trained as a whole in such a framework, with the data flowing through both layers being consistent, as the output of the inner layer will be the input to the outer layer, through the mapping layer 124. Such an approach varies from other joint training frameworks in which the input and output of different models are independent, as here the models are trained using hierarchical unified training where the outer layer depends at least in part upon the result of the inner layer. Since a service, such as a web-based tagging service, can organically incorporate semantics and structures in a knowledge graph, optimal node embeddings can be expected, hence quality tagging performance can be obtained to benefit user and service providers and operators.

Figure 3:
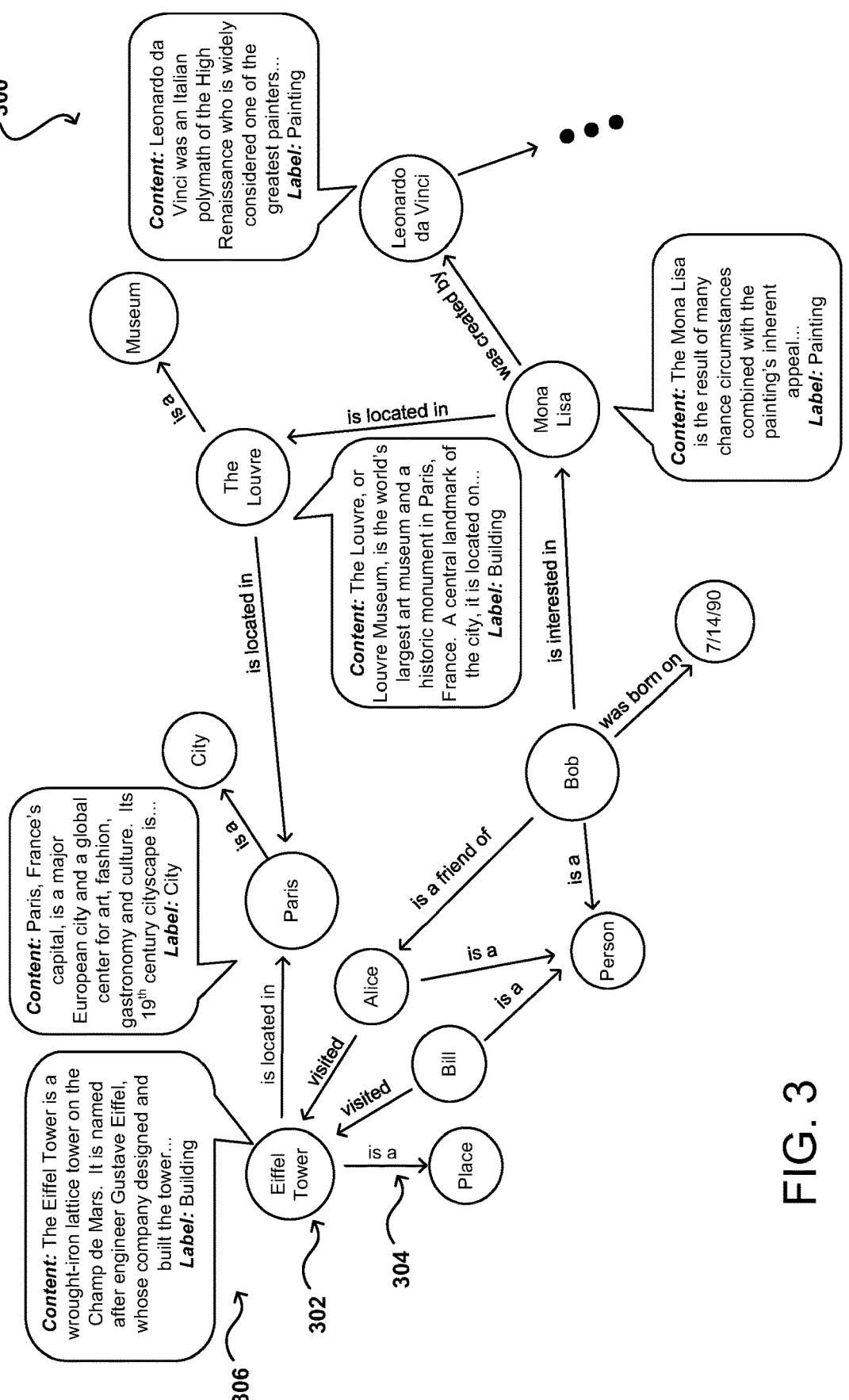
FIG. 3 illustrates an example knowledge graph with related content that can be utilized in accordance with various embodiments.

FIG. 3 illustrates an example knowledge graph 300 that can be utilized with such a framework. As illustrated, such a graph can include a plurality of nodes 302 that are connected using a plurality of links, often referred to as edges 304. Each node 302 in this knowledge graph can refer to a noun or subject, such as a person, place, or thing. Each edge 304 can include a label or data specifying how two nodes are related. For example, the Eiffel Tower node in this example is linked to the Paris node. For some graphs this may be sufficient, but this graph node includes information about the relationship, such that it can be determined that the Eiffel Tower, which is connected to another node as corresponding to a place, is "located in" Paris, which is connected to another node as corresponding to a city. When an instance of content 306 is received or otherwise obtained, that content can be tagged with an appropriate tag, such as "Eiffel Tower" for content 306 discussing the Eiffel Tower. The addition of the Eiffel Tower tag to that content also enables this content to be located if a user or application searches for a related tag, such as a tag for "Paris" or "the Louvre," or a person who recently visited the Eiffel Tower, even thought that information itself was not contained in, or determinable directly from, the content 306 itself. When content is received, input can be provided to the graph model including both the relational structures (e.g., triples like "the Louvre: is located in: Paris") and the semantic embeddings inferred by the inner layer, such as where descriptive content for the entity "the Louvre" is replaced by one or more numerical embeddings to represent "the Louvre."

Figure 4:
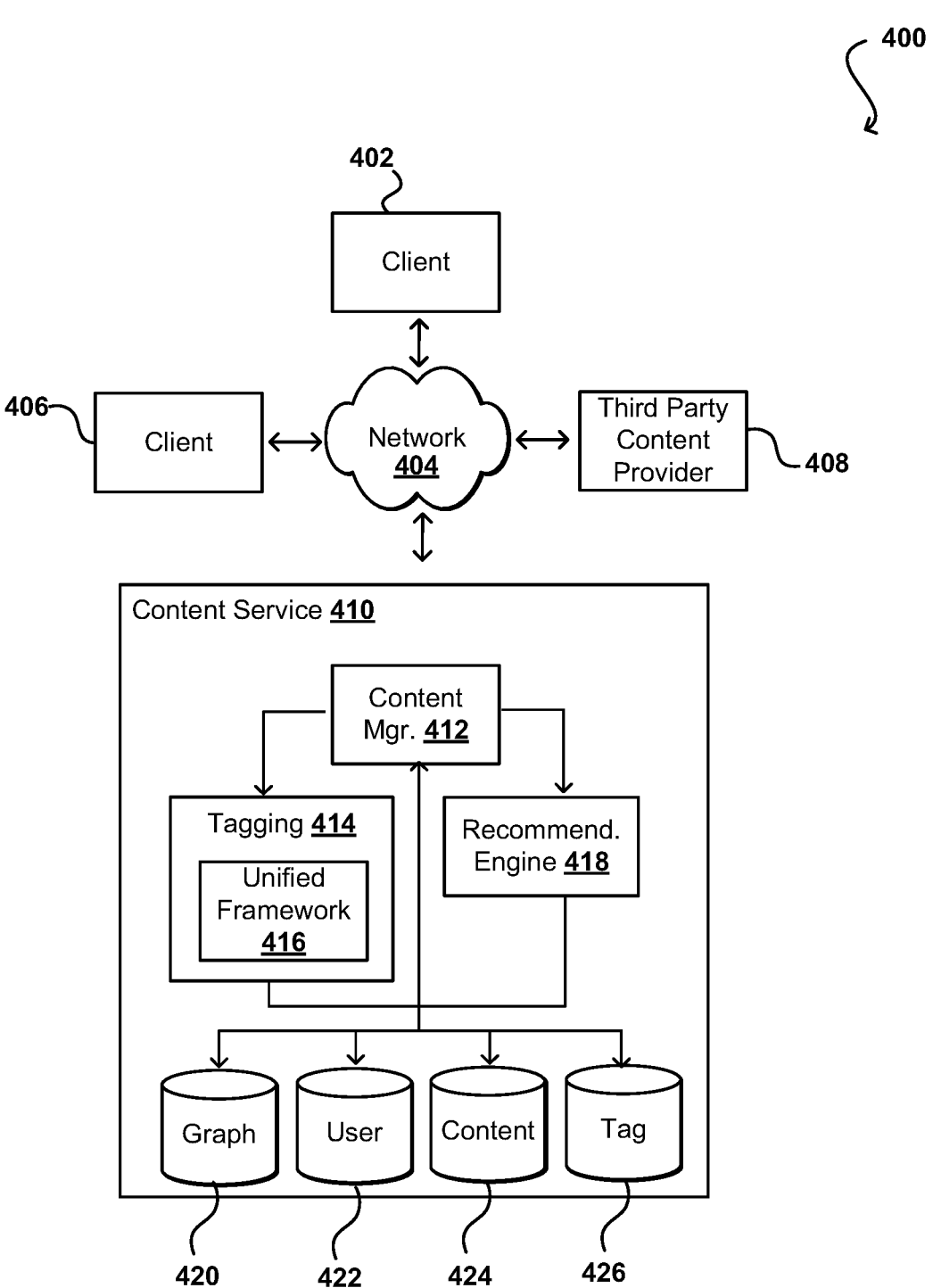
FIG. 4 illustrates a system for managing content tagging that can be utilized in accordance with various embodiments.

FIG. 4 illustrates components of an example system 400 that can utilize models trained and provided through one or more unified frameworks. In this example, a user might use a client device 402, such as a personal computer, tablet, or smartphone, to provide or identify content. This content can be provided or identified across at least one network 404, such as the Internet or a cellular network, to be received by a content service 410 or system. The identified content may be provided with the request, already stored on or available to the content service 410, or may be obtained from a third party content provider 408, among other such options. In this example a content manager 412 receiving the content request may determine one or more tasks to be performed for the content, such as to determine one or more tags for the content that may be used to determine related or recommended content. In this example, information for the content may then be passed to a tagging component 414, which can include or be in communication with a unified inferencing framework 416 as discussed herein. In this example, the content can be processed by the unified inferencing framework 416 to determine, based at least in part upon determined link or label scores, one or more nodes that are relevant to the content, and the tagging service 414 can then determine which tag(s) to add to the content based at least in part upon these nodes, as may include a corresponding node in the graph any node with a direct connection to a corresponding node, or within a number of edges or links, among other such options. In at least one embodiment, the framework can access a relevant knowledge graph from a graph database 420, while the tagging module 414 may use tags from a tag database 426 and can store tagged content 424 (or at least a mapping of tags to content) to a content database 426. In this example, the tags may then be provided to a recommendation engine 418, which might recommend one or more of these tags to the user to apply to the content. In some embodiments, the recommendation may utilize the tags, along with information for the user stored to a user database 422, to instead, or in addition, provide one or more recommendations for other related content or content that might be of interest. The user data may include information about past purchases, views, preferences, searches, or other such information that may help generate recommendations that might be more relevant than searching based on the tags alone, although a recommendation engine might alternatively recommend content based only on the determined tags for the provided content, particularly where relevant user data may not be available or permitted for access.

As mentioned, such an approach can be used for other types of tasks as well. For example, such a framework could be used advantageously for routing tasks, where an attempt is to be made to determine where to route content based on factors such as semantics of the content and a knowledge graph indicating possible routes to potential destinations. This could be used for intelligent QA or customer relation management (CSR), for example, where a question can be routed to an appropriate person or expert based upon the determined semantics of the question and the relevant knowledge graph. As mentioned, such an approach could also be used advantageously for recommendations, such as to recommend other content or products based at least in part upon semantics of provided input and relations between products or content, or tags related to those products or instances of content, etc. Information for content or products can be pulled from any appropriate sources, such as provided descriptions, related articles, user reviews, and the like. The graph model can infer a probability of links between any two nodes of the graph, with a corresponding confidence score in some embodiments, which can be sued to determine related nodes or appropriate edges between nodes for new content. In some embodiments, there may be rules introduced into such a system that can help to catch errors that are detected, such as those that may be made repeatedly by a trained model, in order to improve precision by contradicting the models to remove erroneous inferences.

FIG. 5 illustrates an example process 500 for training models using a unified co-training framework that can be utilized in accordance with various embodiments. It should be understood that for this and other processes presented herein that there can be additional, fewer, or alternative steps performed in similar or alternative orders, or at least partially in parallel, within the scope of the various embodiments unless otherwise specifically stated. In this example, input content is received 502, which for a training process can include an instance of training data that has corresponding ground truth data for comparison. In this example, this process includes at least some amount of textual content. At least an alphanumeric or textual portion of the content can be processed 504 using a language model to infer one or more semantic embeddings for the content, where a semantic embedding can include a numerical vector including values corresponding to various semantic features inferred for the input content. In this example training process, a semantic embedding is used for two purposes. The first purpose is for use within this inner layer, where one or more content labels are determined 506 for the input content from the semantic embedding(s). The second purpose is to provide semantic input to a graph model being co-trained with the language model. This can involve inserting 508 the semantic embedding(s) into a relevant knowledge graph as part of the upper layer of this unified framework. The semantic embedding can be used to replace at least some of the textual content of the knowledge graph. The knowledge graph, including the semantic information, can then be provided 510 as input to a graphing model.

In this example, the graphing model can infer 512 one or more edge scores between a content node, corresponding to the input content and semantic embedding, and other nodes in the knowledge graph. This can include, for example, calculating an edge score for all other nodes in the graph, or nodes within a determined distance in the graph, among other such options. One or more edge labels can then be determined 514 for pairs of these nodes in the graph, such as a "should exist" or "should not exist" label for each pair of the content node and another node of the graph. During this training process, these generated edge labels and content labels, from the graph and language models, respectively, can be compared 516 against the respective ground truth data to determine respective loss values. For this co-training process, a loss function can be utilized that includes terms for both the language loss and the graph loss. An overall training loss value can then be calculated 518 for this training iteration based at least in part upon these individual loss values. A determination can be made 522 as to whether an end criterion has been satisfied for this training process, such as may involve a maximum or target number of training passes or iterations, a loss threshold being satisfied, or all training data being processed, among other such options. If an end criterion has not been satisfied, then the training can continue with a next instance of training data. If an end criterion has been satisfied, then the trained networks can be provided 524 for inferencing.

FIG. 6 illustrates an example process 600 for generating inferences using such trained models in accordance with various embodiments. In this example, input content is received 602, which in many cases will include content other than was used to train the machine learning models. This content can be processed 604 using a trained language model to infer one or more semantic embeddings for the content. The semantic embedding(s) can then be inserted 606 into a relevant knowledge graph. The knowledge graph, including the inferred semantic embedding(s), can then be provided 608 as input to a trained graphing model. The language model and graphing model can have been co-trained using a unified training framework as discussed with respect to at least FIG. 5. One or more edge scores can be inferred 610, using this graphing model, between a content node, corresponding to the input and semantic embedding, and other nodes of the graph. One or more edge labels can then be determined 612 for these pairs of nodes, along with corresponding confidence values in at least one embodiment. At least edge labels that labels should exist for respective pairs of nodes, at least with a minimum probability of level of confidence, can be provided 614 as output of this inferencing process. These labels can then be used for a number of different purposes, such as to determine tags for the input content, determine where to route the input content, or determine other content to recommend based at least in part upon semantics of the input content.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unlabeled data. To avoid selecting an over fitted model as the best model, a training manager can reserve additional data to validate the performance of the model. For example, as illustrated in the training pipeline of FIG. 7, a training data set, such as may include labeled or classified data 702, might be divided into 60 percent for training, and 40 percent for evaluation or validation, which may be divided into two or more stages. A base neural network 706 or machine learning model can be selected for training by a training manager, which cause inferences to be performed on the training data using the model, can compare these inferences against the ground truth training data, can determine an appropriate loss value, and then can perform backpropagation for this loss in order to adjust one or more of the network or model parameters until an end criterion is satisfied and a trained model 708 is obtained.

After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary prediction or labeling, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

Figure 7:
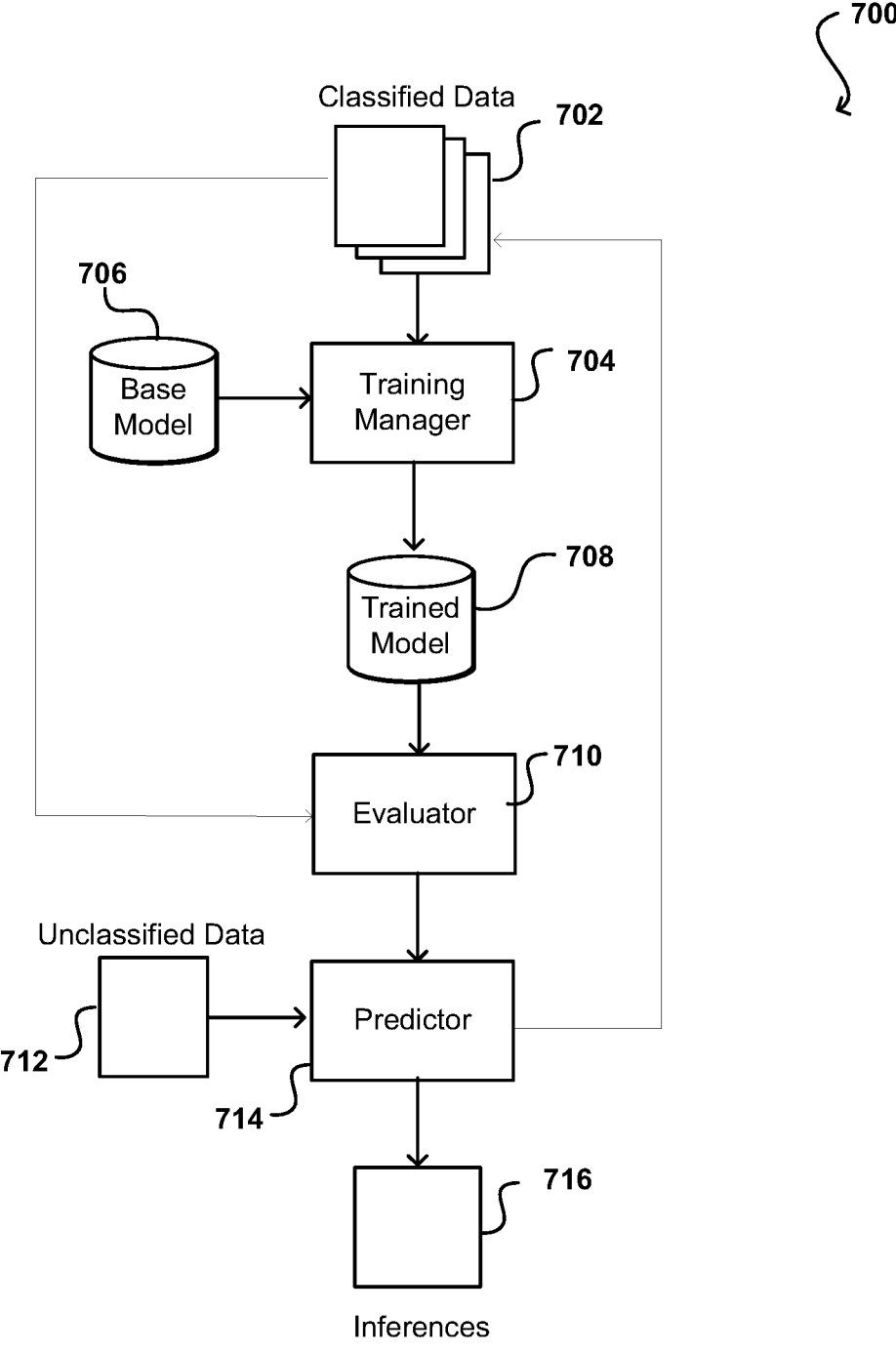
FIG. 7 illustrates an example training pipeline that can be utilized in accordance with various embodiments.

In the example system 700 of FIG. 7, the trained model 708 after evaluation by an evaluator 710 is provided, or made available, to a predictor 714 that is able to use the trained model to process unclassified data, or data that was not utilized as part of the training process or labeled for use in such training. This may include, for example, data received from users or third parties, such as query images that are looking for information about what is represented in those images. The received data can be processed by the predictor using the trained model, and the results 716 (i.e., classifications or predictions) that are produced can be sent back to the respective sources or otherwise processed or stored. In some embodiments, and where such usage is permitted, the predicted data instances can be stored to the classified data repository, or repository for data in which inferences or predictions have been made, which can be used for further training of the trained model 708 by the training manager. In some embodiments the model will be retrained at various times, depending upon factors such as the size of the data set or complexity of the model.

The predictor can include appropriate hardware and software for processing data using the trained model. In some instances, the predictor will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

FIG. 8 illustrates an example neural network 800, or other statistical model, that can be utilized in accordance with various embodiments. In this example the statistical model is an artificial neural network (ANN) that includes a multiple layers of nodes, including an input layer 802, an output layer 806, and multiple intermediate layers 804 of nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

As mentioned, some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 9:
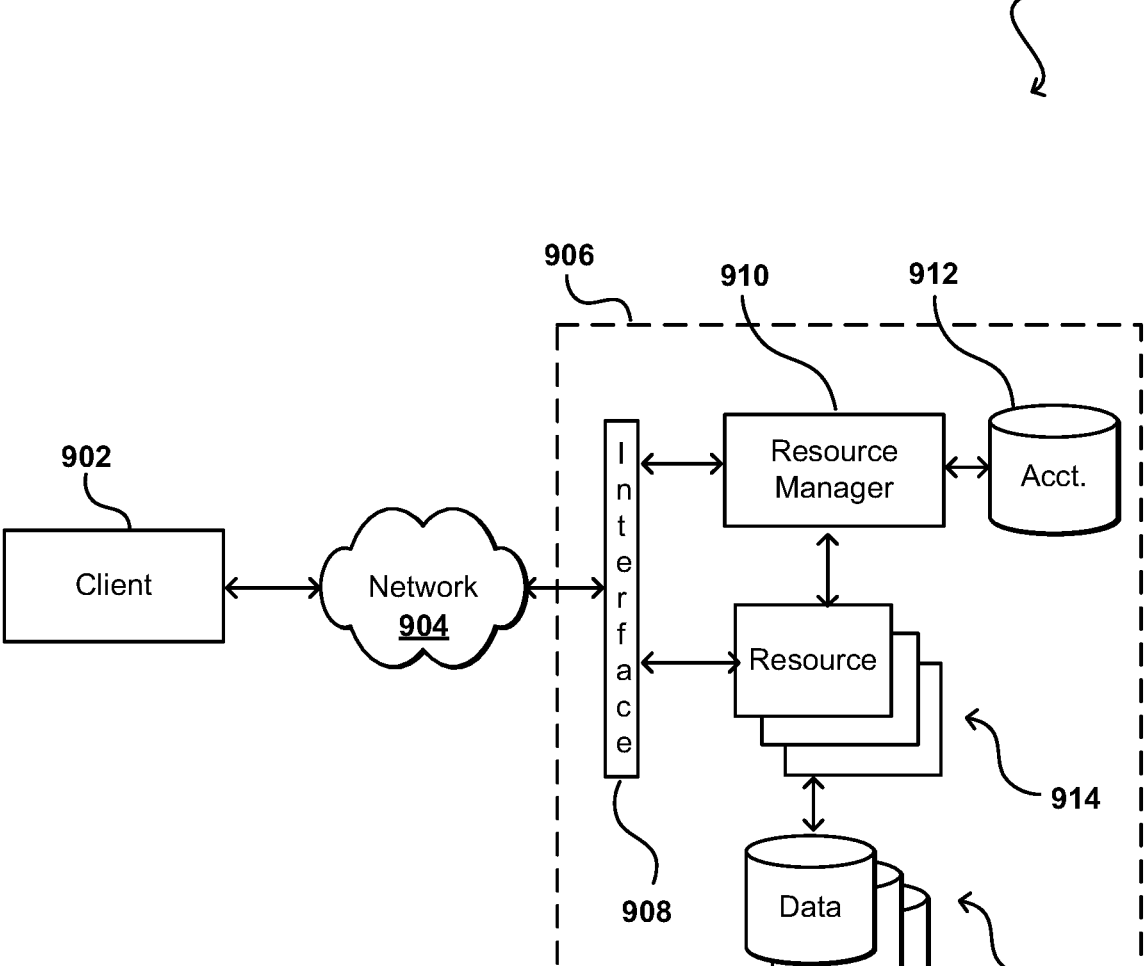
FIG. 9 illustrates components of an example resource environment in which aspects of various embodiments can be implemented.

FIG. 9 illustrates an example environment 900 in which aspect of various embodiments can be implemented. Such an environment can be used in various embodiments to provide resource capacity for one or more users, or customers of a resource provider, as part of a shared or multi-tenant resource environment. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via one or more wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 906 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 10:
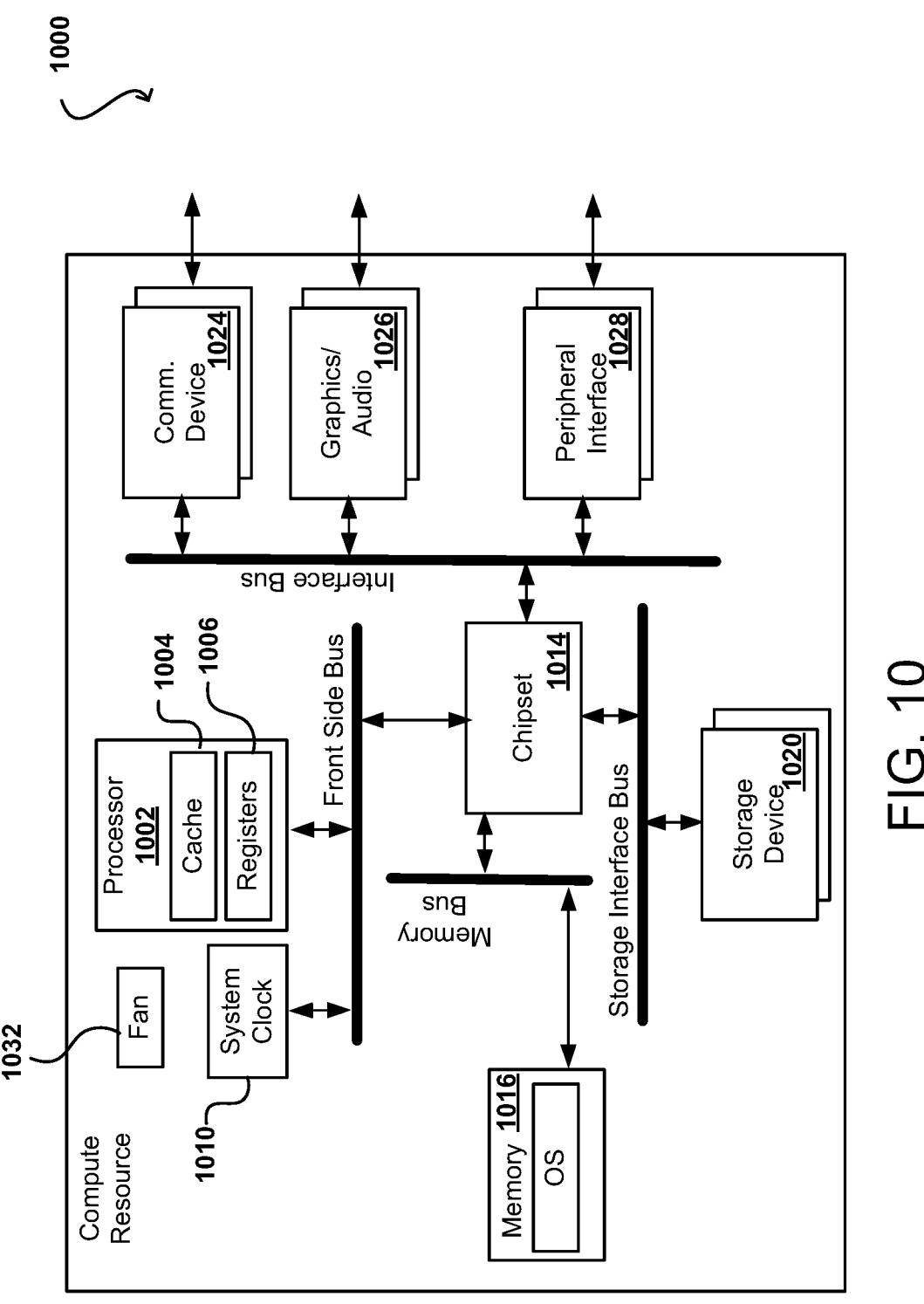
FIG. 10 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 10 illustrates components of an example computing resource 1000 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 1000 (e.g., a desktop or network server) will have one or more processors 1002, such as central processing units (CPUs), graphics processing units (GPUs), and the like, that are electronically and/or communicatively coupled with various components using various buses, traces, and other such mechanisms. A processor 1002 can include memory registers 1006 and cache memory 1004 for holding instructions, data, and the like. In this example, a chipset 1014, which can include a northbridge and southbridge in some embodiments, can work with the various system buses to connect the processor 1002 to components such as system memory 1016, in the form or physical RAM or ROM, which can include the code for the operating system as well as various other instructions and data utilized for operation of the computing device. The computing device can also contain, or communicate with, one or more storage devices 1020, such as hard drives, flash drives, optical storage, and the like, for persisting data and instructions similar, or in addition to, those stored in the processor and memory. The processor 1002 can also communicate with various other components via the chipset 1014 and an interface bus (or graphics bus, etc.), where those components can include communications devices 1024 such as cellular modems or network cards, media components 1026, such as graphics cards and audio components, and peripheral interfaces 1028 for connecting peripheral devices, such as printers, keyboards, and the like. At least one cooling fan 1032 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 1002 can obtain data from physical memory 1016, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 1004 in at least some embodiments. The computing device 1000 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 1028, a communication device 1024, a graphics or audio card 1026, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 1002 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:

receiving, at a content service, an instance of content including digital media, the content service to classify the instance of content using an embedding framework;

generating, using a language model of a first layer of the embedding framework, a semantic embedding for the instance of content;

inserting the semantic embedding, generated by the language model, into a content node of a knowledge graph;

generating, using a graphing model of a second layer of the embedding framework, one or more graph labels indicating a connection from the content node to one or more related nodes in the knowledge graph, the one or more graph labels being generated based at least in part on the inserted semantic embedding;

providing, based on the one or more graph labels, the information for the one or more related nodes as corresponding to the instance of content; and applying, using the content service, a classification to the instance of content based on the provided information.

2. The method of claim 1, further comprising:

generating one or more language labels for the semantic embedding;

comparing the one or more language labels against one or more ground truth labels for the instance of content; and calculating a language loss based upon a difference between the one or more language labels and the one or more ground truth labels for the instance of content.

3. The method of claim 2, further comprising:

comparing the one or more graph labels against one or more ground truth labels for the instance of content; and calculating a graph loss based upon a difference between the one or more graph labels and the one or more ground truth labels for the instance of content.

4. The method of claim 3, further comprising:

calculating an overall loss based upon the language loss and the graph loss; and adjusting network parameters for the language model and the graphing model based upon the overall loss.

5. The method of claim 1, further comprising:

utilizing the information for the one or more related nodes to generate one or more content tags to be associated with the instance of content.

6. The method of claim 1, further comprising:

utilizing the information for the one or more related nodes to determine how to route the instance of content through a network.

7. The method of claim 1, wherein the language model and the graphing model are provided in layers of a hierarchical, unified framework.

8. The method of claim 1, further comprising:

adding the content node, and the connection from the content node to one or more related nodes, to the knowledge graph.

9. The method of claim 1, further comprising:

providing one or more recommendations for related content, the related content being associated with the one or more related nodes in the knowledge graph.

10. A system, comprising:

one or more processors; and memory including instructions that, when executed by the one or more processors, cause the system to:

receive, at a content service, an instance of content including digital media, the content service to classify at least a portion of the instance of content using an embedding framework;

generate, using a language model of a first layer of the embedding framework, a semantic embedding for the instance of content;

insert the semantic embedding, generated by the language model, into a content node of a knowledge graph;

generate, using a graphing model of a second layer of the embedding framework, one or more graph labels indicating a connection from the content node to one or more related nodes in the knowledge graph, the one or more graph labels being generated based at least in part on the inserted semantic embedding;

provide, based on the one or more graph labels, the information for the one or more related nodes as corresponding to the instance of content; and apply, using the content service, a classification to the instance of content based on the information.

11. The system of claim 10, wherein the instructions when executed further cause the system to:

generate one or more language labels for the semantic embedding;

compare the one or more language labels against one or more ground truth labels for the instance of content; and calculate a language loss based upon a difference between the one or more language labels and the one or more ground truth labels for the instance of content.

12. The system of claim 11, wherein the instructions when executed further cause the system to:

compare the one or more graph labels against one or more ground truth labels for the instance of content; and calculate a graph loss based upon a difference between the one or more graph labels and the one or more ground truth labels for the instance of content.

13. The system of claim 11, wherein the instructions when executed further cause the system to:

calculate an overall loss based upon the language loss and the graph loss; and adjust network parameters for the language model and the graphing model based upon the overall loss.

14. The system of claim 10, wherein the instructions when executed further cause the system to:

utilize the information for the one or more related nodes to generate one or more content tags, to be associated with the instance of content, or determine how to route the instance of content through a network.

15. The system of claim 10, wherein the language model and the graphing model are provided in layers of a hierarchical, unified framework.

16. A non-transitory computer-readable storage medium storing instructions that, when executed by a processor of a computing device, cause the computing device to:

receive, over a network by a content manager including an inferencing framework, a request from a user to classify at least a portion of an instance of digital content, the instance of digital content stored accessible to the content manager;

generate, using a language model of a first layer of the embedding framework, a semantic embedding for the instance of content;

insert the semantic embedding, generated by the language model, into a content node of a knowledge graph;

generate, using a graphing model of a second layer of the embedding framework, one or more graph labels indicating a connection from the content node to one or more related nodes in the knowledge graph, the one or more graph labels being generated based at least in part on the inserted semantic embedding;

provide, to the user from the content manager and based on information for the one or more related nodes as corresponding to the instance of content, one or more classifications of at least the portion of the instance of digital content.

17. The non-transitory computer-readable storage medium of claim 16, wherein the instructions when executed further cause the computing device to:

utilize the information for the one or more related nodes to generate one or more content tags, to be associated with the digital instance of content, or determine how to route the instance of content through a network.

18. The non-transitory computer-readable storage medium of claim 16, wherein the language model and the graphing model are provided in layers of a hierarchical, unified framework.

19. The non-transitory computer-readable storage medium of claim 16, wherein the instructions when executed further cause the computing device to:

add the content node, and the connection from the content node to one or more related nodes, to the knowledge graph.

20. The non-transitory computer-readable storage medium of claim 16, wherein the instructions when executed further cause the computing device to:

provide one or more recommendations for related content, the related content being associated with the one or more related nodes in the knowledge graph.

* * * * *